THREE-INPUT BINARY LOGIC DEVICE 16

INVENTOR.
Luther D. Rudolph
BY Yuter & Spiecens
ATTORNEYS

TWO-INPUT TERNARY LOGIC DEVICE 36

TWO-INPUT TERNARY LOGIC DEVICE 36A

FIG. 12
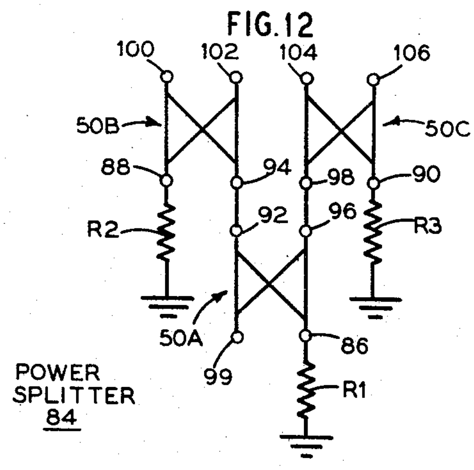
FIG. 13
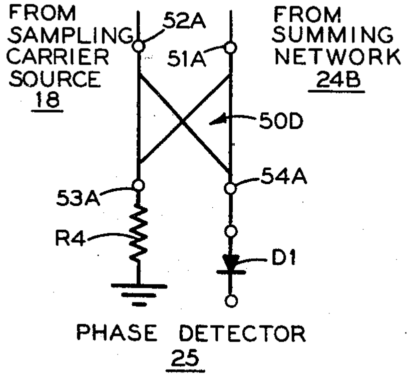
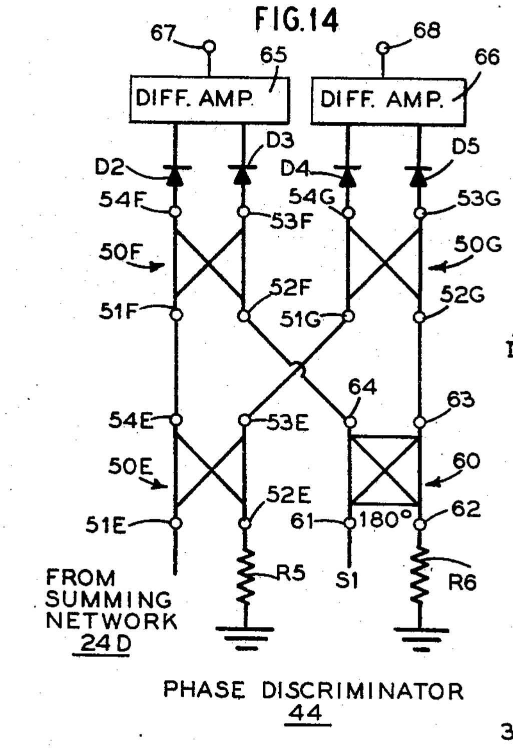
FIG. 15
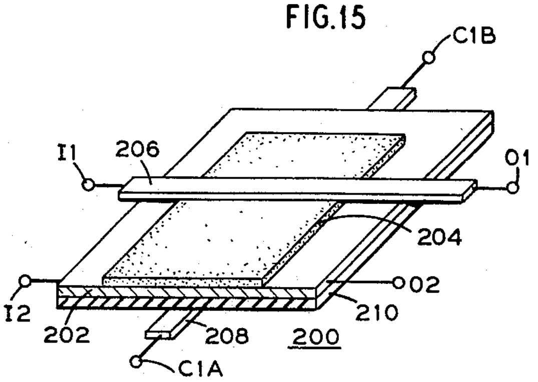
FIG. 19
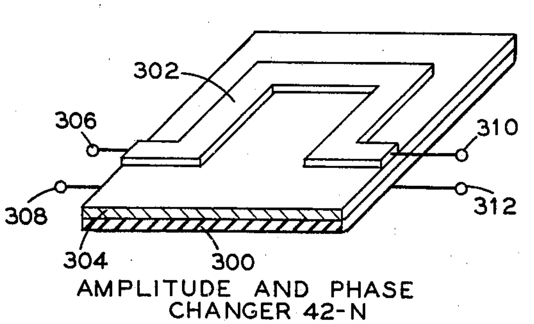
AMPLITUDE AND PHASE CHANGER 42-N March 10, 1970 L. D. RUDOLPH 3,500,061
UNIVERSAL LOGIC DEVICES
Filed June 22, 1967 7 Sheets-Sheet 7
FIG. 16
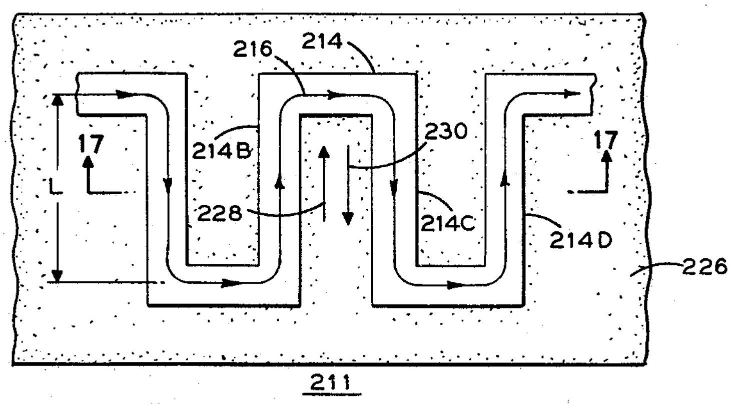
FIG. 17
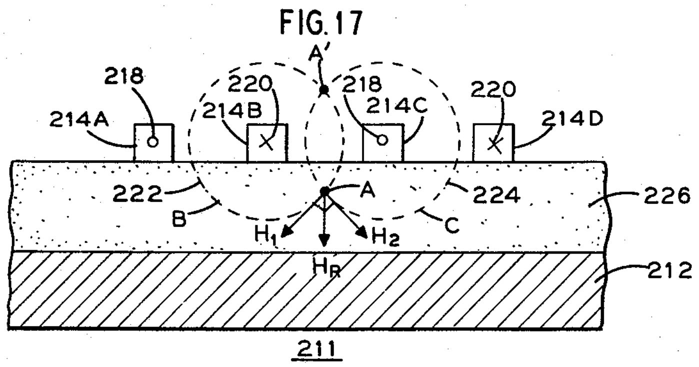
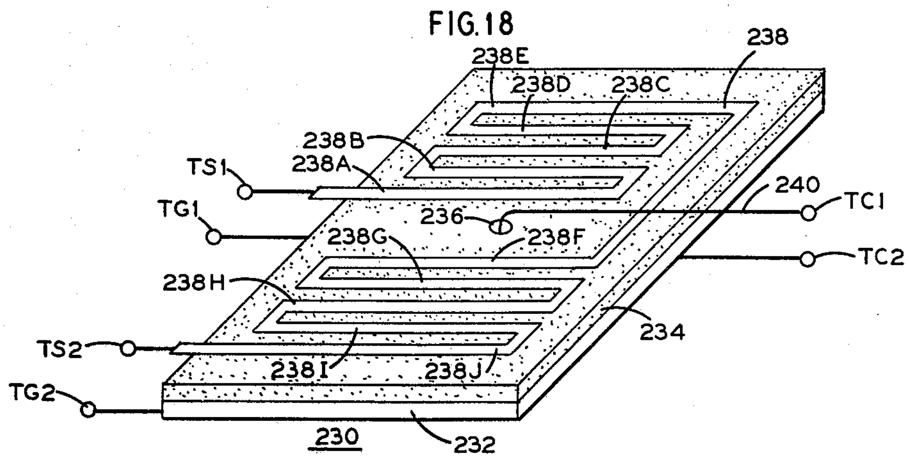

United States Patent Office 3,500,061
Patented Mar. 10, 1970

3,500,061
UNIVERSAL LOGIC DEVICES
Luther D. Rudolph, Manlius, N.Y., assignor to Research Corporation, New York, N.Y., a nonprofit corporation of New York
Filed June 22, 1967, Ser. No. 647,987
Int. Cl. H03k *19/20*
U.S. Cl. 307—210 33 Claims

ABSTRACT OF THE DISCLOSURE

There is disclosed a logic device for performing a logic operation on a plurality of logic variables in an *l*-level logic system wherein the values of the logic variables are represented by signals having amplitudes related to the *l*-levels of the logic system. The device includes an input transformation means in the form of a matrix of signal phase shifters. Carrier signals are fed columnwise through the phase shifters and signals representing the input variables control respective rows of the phase shifters. The phase shifters change the phase of the carrier signals passing therethrough in accordance with the amplitudes of logic-variable-representing signals. From the matrix, the carrier signals are fed via phase amplitude changers (fixed for the specific device) to a signal summing network. The output of the summing network indicates the result of the logic operation on the particular values of the input logic variables.

This invention pertains to logic devices and more particularly to a general technique for providing a universal class of logic devices.

Many data processing and control systems rely on elementary logic elements to perform the digital operations on the data. In fact, all present day digital computers utilize very large networks of basic binary logic elements to mechanize the Boolean logic functions required in solving problems or in processing information. Such logic elements are so well known that they have received characteristic names associated with the elemental or micro-Boolean functions they represent. For example AND circuits, OR circuits, NAND circuits, NOT circuits are terms representing the basic binary logic elements which are well known in the digital computer art. The macro-Boolean functions are mechanized by specific combinations of these basic binary logic elements. It is the job of the logic designer to suitably interconnect these circuits in accordance with the rules expressed by the macro-Boolean functions. As the Boolean functions become more and more complex, the number and interconnections of the basic logic elements becomes excessively large. Unless care and ingenuity are exercised by the logic designer redundancies enter the network. Hence a skilled designer spends considerable time minimizing the network.

It is accordingly a general object of the invention to provide logic devices which more efficiently satisfy the Boolean functions of a binary logic system.

It is another object of the invention to provide a logic device which with minor modifications can be used to satisfy all but an insignificant few of many Boolean functions associated with a given number of logic input variables.

It has long been known that there are more powerful logic systems than the two-level or binary or Boolean logic system. For example, it is well known among logic theoreticians that a three-level or ternary logic system is in theory more economic. However, in spite of the many articles written on ternary logic systems few, if any, digital data processing systems have been built using such a logic system. The basic reason is that no economically practical three-level components were proposed.

It is, accordingly, another general object of the invention to provide logic devices for utilization in three-level or ternary logic systems which can be realized with economically practical components.

In fact, it is a very important object of the invention to provide logic devices for any level logic systems with any number of logic input variables wherein the devices are realizable with economically practical components.

Generally, the invention contemplates apparatus for performing a logic operation on a plurality of logic variables in an *l*-level logic system wherein the values of the logic variables are represented by signals having a parameter, such as amplitude, related to the *l* levels of the logic system.

The apparatus comprises an input transformation means for operating on the signals representing the logic variables to produce a plurality of carrier signals having phase relationships related to the values of the logic variables and the possible combinations of the logic variables in the *l*-level logic system. Means modify at least the amplitude of at least one of the carrier signals at least in a manner related to the type of logic operation to be performed. And means sum the carrier signals, including the modified carrier signals to provide a signal representing the result of the logic operation.

It should be noted that such apparatus need not be restricted to *l*-level logic systems where *l* is generally construed to be a positive integer but could be extended to logic systems when *l* represents any real number as well as even to pattern recognition.

A feature of the invention which is utilized in the input transformation means is an "exclusive-or" logic device. The logic device performs a logic operation on *n* logic variables in an *l*-level logic system wherein the logic variables are represented by signals having any one of *l* different values. The apparatus comprises a carrier signal source and *n* signal-value-controlled phase shifters. A carrier signal conductor means connects the phase shifters in series with the carrier signal source so that the carrier signals from the carrier signal source pass through all of the phase shifters to the end of the conductor remote from the source. Each of the signals representing the logic variables is coupled to one of the phase shifters. Each of the phase shifters includes a phase shift element which introduces in a carrier signal a phase shift of substantially $$\frac{2\pi ka}{l}$$

degrees (where $k=0, 1, \ldots, l-1$, and $a=0, 1, \ldots, l-1$) so that each value of the logic variable causes the phase shift element to shift the phase of the carrier signal according to a different value of *k*. Accordingly, the phase of the carrier signal at the remote end of the conductor represents the result of the logic operation.

While the apparatus of the invention can be realized with many devices utilizing carrier signals, it has been found that microwave devices are ideally suited for performing such a role.

Other objects, the features and advantages of the invention will be apparent from the following detailed description of the invention when read with the accompanying drawings which show by way of example and not limitation the now preferred embodiments of the invention. In the drawings.

Figure 4:
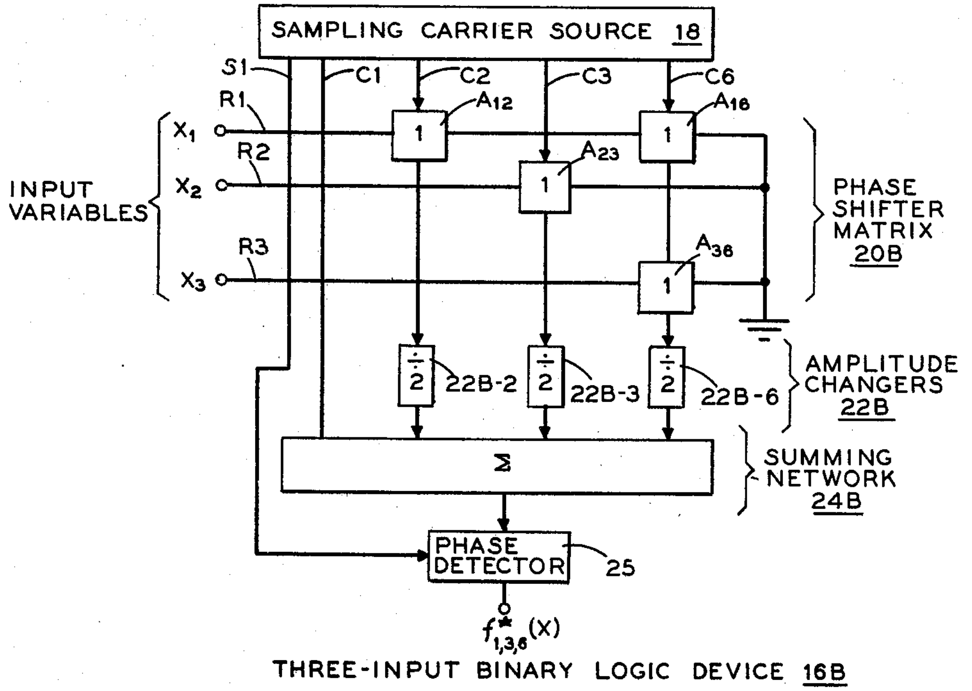
FIGURE 4 shows schematically a still further simplification of the logic device of FIGURE 2.
Figure 5:
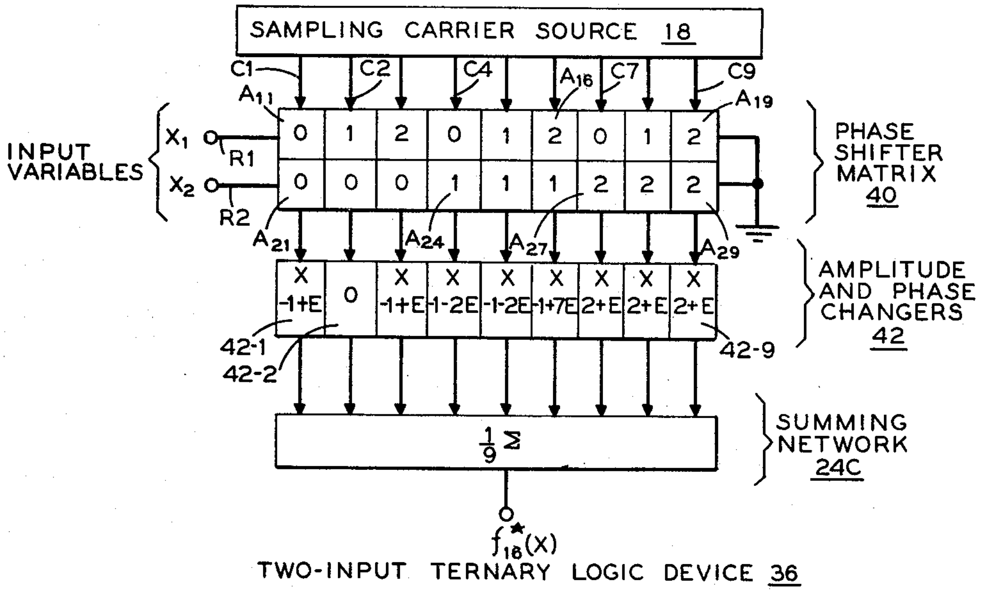
FIGURE 5 shows schematically a logic device for executing a two-input ternary logic operation.
Figure 6:
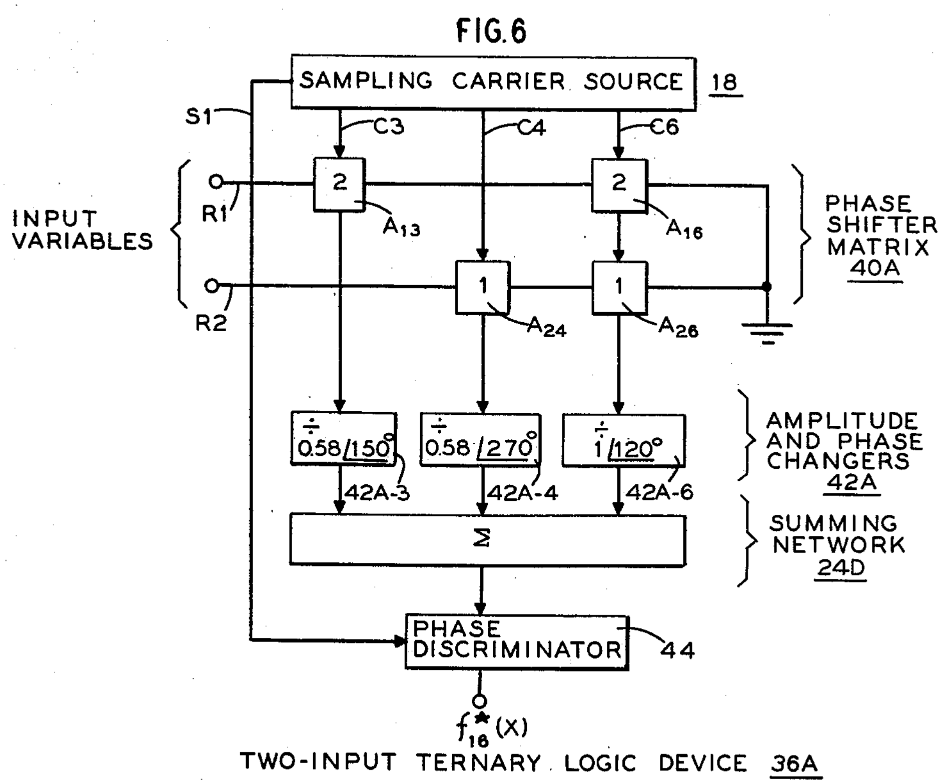
FIGURE 6 shows schematically a simplification of the logic device of FIGURE 5.
Figure 7:
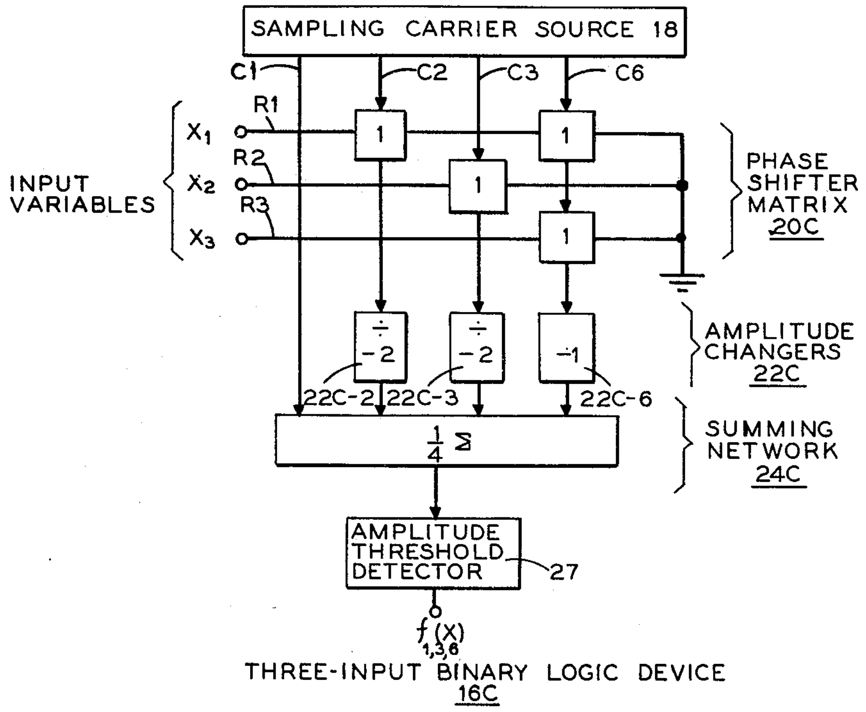
Figure 8:
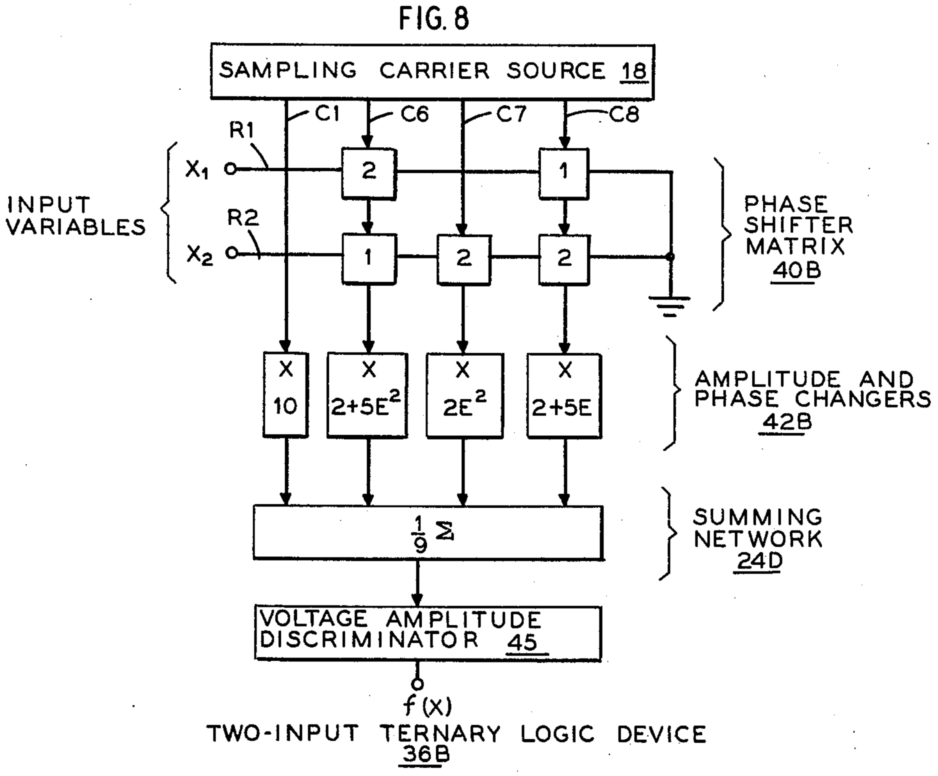
Figure 9:
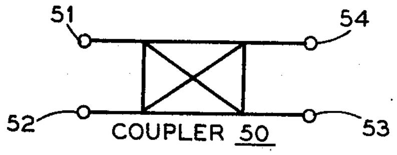
Figure 10:
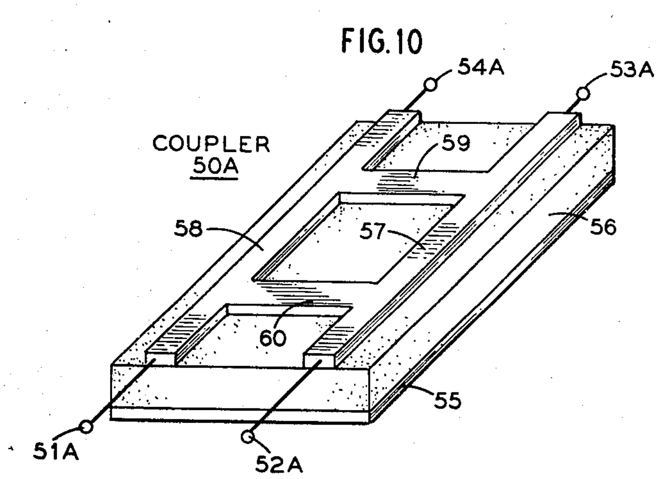
Figure 11:
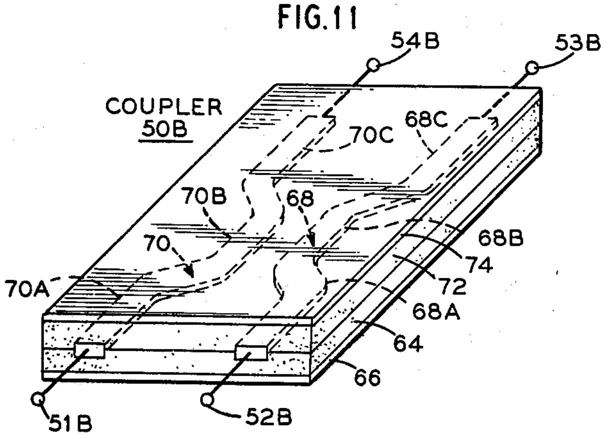

FIGURE 7 schematically shows a variation of the logic device of FIGURE 4;

FIGURE 8 shows in schematic form a variation of the logic device of FIGURE 7;

FIGURE 9 shows a symbolic representation of a coupler used in a microwave realization of the logic devices;

FIGURE 10 shows a perspective view of one embodiment of the coupler of FIGURE 9;

FIGURE 11 shows a perspective view of another embodiment of the coupler of FIGURE 9;

FIGURE 12 shows schematically a power splitter employed as the carrier signal source and the summing networks in a microwave realization of the logic devices;

FIGURE 13 shows a microwave realization of the phase detector used in the logic device of FIGURE 4;

FIGURE 14 shows the physical realization of the phase discriminator used in FIGURE 6;

FIGURE 15 is a perspective view of a phase shifter used in the microwave realization of the logic devices of FIGURES 2, 3, 4 and 7;

FIGURE 16 is a plan view of a portion of a phase shifter used in the microwave realization of the logic devices of FIGURES 5, 6 and 8;

FIGURE 17 is a sectional view taken along the line 17—17 of FIGURE 16;

FIGURE 18 is a perspective view of the phase shifter of FIGURES 16 and 17; and

FIGURE 19 is a perspective view of a microwave realization of the amplitude and phase changer of the logic devices.

Any logic function $f^*(x)$ can be represented by the product of two linear transformations in the following manner:

$$(1)\qquad f^*(x)=l^{-n}\{xA^T\}^*w_0$$

The * operation is a convenience which will hereinafter become apparent for transforming logic levels to signal-phase displacements.

In general the * operation has the following function:

$$(2)\qquad V_l(a)=\exp\left(\frac{2\pi ia}{l}\right);\ a=0,1,\ldots,l-1$$

where "exp" is the usual exponential function; $i$ is $\sqrt{-1}$; $l$ is the level of the logic system (binary, ternary, etc.); $a$ is the specific value of a variable in the logic system. The following examples will make the operation clearer.

In a binary logic system, $l=2$, and $a$ takes the values of 0 and 1. Therefore, in a phase-displacement representation of a binary logic system Equation 2 takes the form:

$$(3)\qquad V_2(a)=\exp\left(\frac{2\pi ia}{2}\right);\ a=0,1$$

Hence, when $a=0$, $V_2(0)=1$; and when $$a=1,\ V_2(1)=1/180^\circ=-1$$

In a ternary logic system, $l=3$ and $a$ takes the values of 0, 1 and 2. Therefore, in a phase displacement representation for a ternary logic system Equation 2 takes the form:

$$(4)\qquad V_3(a)=\exp\left(\frac{2\pi ia}{3}\right);\ a=0,1,2$$

Hence, when $a=0$, $V_3(0)=1$; when $a=1$, $$V_3(1)=1/120^\circ;$$

and when $a=2$, $V_3(2)=1/240^\circ$. For later mathematical manipulations it is convenient to define $1/120^\circ$ as E, and $1/240^\circ$ as $E^2$.

Returning to Equation 1, $l$ has the values associated with the number of levels in the logic system, i.e. $l=2$ for a binary system, $l=3$ for a ternary logic system etc.; and $n$ equals the number of input variables under consideration. Therefore, $n$ is an integer greater than zero. Furthermore, $A^T$ is the transpose of the standard logic matrix A constructed from the truth table associated with the particular logic system under consideration. In general, matrix A is an $m\ x\ n$ matrix, where $n$ is the number of input variables under consideration and $m=l^n$ ($l$=order of the logic system or number of logic levels).

The following examples will clarify this definition. Consider a three-input variable binary-logic system. A truth table for such a system is:

TABLE 1

| Function Number | Input Variables $x_3$ | $x_2$ | $x_1$ | Logic Value, $a$ | Phase Value, $V_2(a)$ |
|---|---|---|---|---|---|
| 0 | 0 | 0 | 0 | 0 | (+1) |
| 1 | 0 | 0 | 1 | 1 | (−1) |
| 2 | 0 | 1 | 0 | 0 | (+1) |
| 3 | 0 | 1 | 1 | 1 | (−1) |
| 4 | 1 | 0 | 0 | 0 | (+1) |
| 5 | 1 | 0 | 1 | 0 | (+1) |
| 6 | 1 | 1 | 0 | 1 | (−1) |
| 7 | 1 | 1 | 1 | 0 | (+1) |

Table 1 contains much more information than required at present. (It also includes logic and phase values to be used in a subsequent example.) For the present, $$(5)\qquad \text{Matrix A, more particularly } (A_{3,2})=\begin{bmatrix}0&0&0\\0&0&1\\0&1&0\\0&1&1\\1&0&0\\1&0&1\\1&1&0\\1&1&1\end{bmatrix}$$

or, a 3×8 matrix (three input variables in a binary logic system).

Matrix $A^T_{3,2}$ is obtained in the usual manner by interchanging matrix rows and columns. Therefore $$(6)\qquad \text{Matrix } A^T{}_{3,2}=\begin{bmatrix}0&0&0&0&1&1&1&1\\0&0&1&1&0&0&1&1\\0&1&0&1&0&1&0&1\end{bmatrix}$$

TABLE 2

| Function Number | Input Variables $x_2$ | $x_1$ | Logic Value, $a$ | Phase Value, $V_3(a)$ |
|---|---|---|---|---|
| 1 | 0 | 0 | 1 | E |
| 2 | 0 | 1 | 0 | 1 |
| 3 | 0 | 2 | 2 | $E^2$ |
| 4 | 1 | 0 | 2 | $E^2$ |
| 5 | 1 | 1 | 1 | E |
| 6 | 1 | 2 | 0 | 1 |
| 7 | 2 | 0 | 1 | E |
| 8 | 2 | 1 | 2 | $E^2$ |
| 9 | 2 | 2 | 1 | E |

Table 2, just as Table 1, contains much more information than requested at present. For the present, $$(7)\qquad \text{Matrix A, more particularly } (A_{2,3})=\begin{bmatrix}1\\0\\1\\1\\0\\1\\2\\2\\2\end{bmatrix}$$

7
2
2
12)00

0
1
0 or a 2×9 matrix (two input variables in a ternary logic system). And $$(8)\qquad \text{Matrix } A^T{}_{2,3}=\begin{bmatrix}0&0&0&1&1&1&2&2&2\\0&1&2&0&1&2&0&1&2\end{bmatrix}$$

Now, again returning to Equation 1, $x$ is the input vector or $1\times n$ matrix $[x_n, \ldots, x_2, x_1]$ of the input variables. If the number ($n$) of input variables is three, as given in Table 1, then $x=[x_3, x_2, x_1]$; if the number of input variables is two as given in Table 2, then $$x=[x_2, x_1]$$

Again, returning to Equation 1, the expression $\{xA^T\}$ indicates normal matrix multiplication modulo the logic level under consideration. The resulting product matrix so obtained then undergoes the operation. In particular each entry of the resulting matrix undergoes the operation.

The only item not considered in Equation 1 is the expression $w_0$. Now, $w_0$ is an $m\times 1$ matrix or an $m$ component vector acting as a weight vector which is dependent on the actually desired logic function. Assume for generality the desired logic function is $f^*$, then $$w_0=H^cf^* \tag{9}$$

where $H^c$ is the transpose of a matrix H with each entry being substituted by its complex conjugate. The $$\text{Matrix } H=\{AA^T\}^* \tag{10}$$

where A, $A^T$ and $\{\ \}^*$ are as previously defined.

Since in a binary-logic system, all the entries of the matrix H are real numbers, the amtrix $H^c_{3,2}$ (the complex conjugate of the transpose of the matrix H) is just the transpose of the matrix H or $$H^c_{(3,2)}=\begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ -1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix} \tag{11}$$

an $8\times 8$ Hadamard matrix.

In a two-input ternary-logic system $$H^C_{(3,2)}=\begin{bmatrix} 1 & 1 & 1 & 1 & 1 & 1 & 1 & 1 & 1 \\ 1 & E^2 & E & 1 & E^2 & E & 1 & E^2 & E \\ 1 & E & E^2 & 1 & E & E^2 & 1 & E & E^2 \\ 1 & 1 & 1 & E^2 & E^2 & E^2 & E & E & E \\ 1 & E^2 & E & E^2 & E & 1 & E & 1 & E^2 \\ 1 & E & E^2 & E^2 & 1 & E & E & E^2 & 1 \\ 1 & 1 & 1 & E & E & E & E^2 & E^2 & E^2 \\ 1 & E^2 & E & E & 1 & E^2 & E^2 & E & 1 \\ 1 & E & E^2 & E & E^2 & 1 & E^2 & 1 & E \end{bmatrix} \tag{12}$$

a $9\times 9$ matrix.

Figure 1:
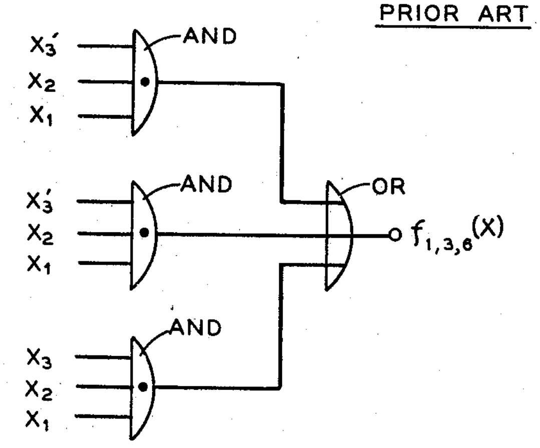
FIG. 1 PRIOR ART
FIGURE 1 shows a logic diagram for mechanizing a particular three-input Boolean function which is used as an example in teaching the invention.

Now, as has been stated above, the value of $f^*$ is determined by the desired logic function. As an example assume the three-input binary logic function which is shown in FIGURE 1 in conventional D.C. Boolean logic symbols and which is expressed as follows:

$$f=(x_3'\cdot x_2'\cdot x_1)+(x_3'\cdot x_2\cdot x_1)+(x_3\cdot x_2\cdot x_1') \tag{13}$$

where:

$(\cdot)$=the "and" function;
$(+)$=the "inclusive or" function; and
$(')$=the "not" function.

These are the functions numbered 1, 3 and 6 of Table 1

$$\text{or } f(1, 3, 6)=f_{1,3,6}(x)=(0, 1, 0, 1, 0, 0, 1, 0) \tag{14}$$

$$\text{and } f^*_{1,3,6}(x)=(+1, -1, +1, -1, +1, +1, -1, +1) \tag{14a}$$

an $8\times 1$ martix or 8 component vector.

Now, since $w_0=H^cf^*(x)$, then in this particular case $$w_0=[H^c_{(3,2)}][f^*_{1,3,6}(x)]=\begin{bmatrix} +2 \\ +2 \\ +2 \\ +2 \\ -2 \\ +6 \\ -2 \\ -2 \end{bmatrix} \tag{15}$$

It should be noted that this is the multiplication of an $8\times 8$ matrix and an $8\times 1$ matrix to obtain an $8\times 1$ weight matrix or eight component weight vector.

As an example of a two-input ternary logic function consider the function defined by Table 2, $$\text{i.e. } f^*_{16}(x)=(E, 1, E^2, E^2, E, 1\ E, E^2, E) \tag{16}$$

$$\text{Then, } w_0=[H^c_{(2,3)}][f^*_{16}(x)]=\begin{bmatrix} -1+E \\ 0 \\ -1+E \\ -1-2E \\ -1-2E \\ -1-7E \\ 2+E \\ 2+E \\ 2+E \end{bmatrix} \tag{17}$$

where $H^c_{(2,3)}$ is defined by Equation 12 and $f^*_{16}(x)$ is defined by Equation 16. It should be noted that this is the multiplication of a $9\times 9$ matrix and a $9\times 1$ matrix or nine component vector to give a $9\times 1$ matrix or nine component vector.

Now applying Equation 1 to the logic function defined by Table 1 there is obtained $$f^*_{1,3,6}(x)=1^{-n}\{XA^T_{3,2}\}w_0= \tag{18}$$

$$\frac{1}{8}\left\{(x_3, x_2, x_1)\left\{\begin{bmatrix} 0 & 0 & 0 & 0 & 1 & 1 & 1 & 1 \\ 0 & 0 & 1 & 1 & 0 & 0 & 1 & 1 \\ 0 & 1 & 0 & 1 & 1 & 1 & 0 & 1 \end{bmatrix}\right\}^*\right. \begin{bmatrix} +2 \\ +2 \\ +2 \\ +2 \\ -2 \\ +6 \\ -2 \\ -2 \end{bmatrix}$$

$$(18a)=\frac{1}{8}\{0, x_1, x_2, x_2+x_1, x_3, x_3+x_1, x_3+x_2, x_3+x_2+x_1\}^*\begin{bmatrix} +2 \\ +2 \\ +2 \\ +2 \\ -2 \\ +6 \\ -2 \\ -2 \end{bmatrix}$$

$$(18b)=\frac{2\{0\}^*+2\{x_1\}^*+\ldots+6\{x_3+x_1\}^*\ldots-2\{x_2+x_1\}^*}{8}$$

Applying Equation 1 to the logic function defined by Table 2 there is obtained:

$$f^*_{16}(x)=l^{-n}\{xA^T_{2,3}\}^*w_0= \tag{19}$$

$$\frac{1}{9}\left\{(x, x_1)\begin{bmatrix} 0 & 0 & 0 & 1 & 1 & 1 & 2 & 2 & 2 \\ 0 & 1 & 2 & 0 & 1 & 2 & 0 & 1 & 2 \end{bmatrix}\right\}^*\begin{bmatrix} -1+E \\ 0 \\ -1+E \\ -1-2E \\ -1-2E \\ -1+7E \\ 2+E \\ 2+E \\ 2+E \end{bmatrix}$$

where $w_0$ is defined by Equation 17. Equation 19 can be expanded in the same way that Equation 18 was expanded to Equations 18a and 18b. However, since the calculations are straight forward and for the sake of conciseness the calculation will not be given.

A close look at Equation 18b indicates that the equation is equivalent to the algebraic sum of a plurality of suitably weighted terms. Each of the terms is a modulo type sum which is then converted by a * operation. Now it is known that a series of signal phase shifters serially add phase shift to a signal and the phase shift is added modulo $2\pi$. Therefore, each of the terms is an "exclusive or" function in a phase script carrier logic representation. Thus Equation 18b can be realized by: (1) utilizing exclusive -OR type logic elements in a system employing phase script carrier signals through the logic elements wherein the logic elements are controllable phase shifters; (2) amplitude attenuating the outputs of each of the logic elements; and (3) amplitude summing the attenuated signals.

On the other hand, when Equation 18 is considered, a more powerful and universal realization can be obtained. The matrix $A^T_{3,2}$ can be considered as a degenerate $3\times 8$ array of controllable phase shifters wherein the phase shifters are only present at the "1" entries of the matrix. Each of the variables 76 simultaneously control all the phase shifters in one associated row of the three rows of the array. Output signals are taken in parallel along the eight columns of the array. Each of the eight output signals is then fed to an appropriate amplitude changer, and the outputs of the amplitude changers are fed to a summing network. The output of the summing network is the value of the function.

Figure 2:
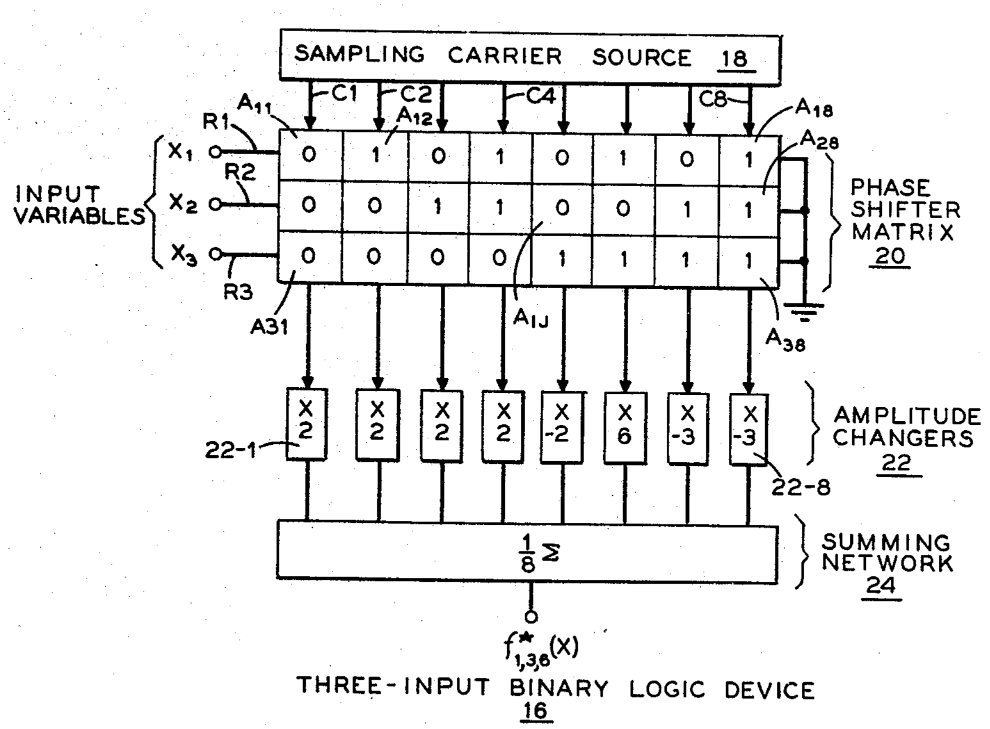
FIGURE 2 shows schematically a binary logic device for mechanizing the same Boolean function of FIGURE 1 according to the invention.

The straight forward realization of Equation 18 is shown in FIGURE 2. Before going into the details of the elements of FIGURE 2, the realization will be simplified. First every phase shift element $a_{ij}$ in the phase shift matrix 20 which is shown as "0" is not present. Second, by taking into account the interplay of the amplitude changers and the scaling factor introduced in the summing network as well as recognizing the desire to use only attenuators (for circuit simplicity) for the amplitude changers 22–1 to 22–8, the scaling factors, since they are linear, can be normalized. Accordingly, FIGURE 3 shows such simplifications.

Figure 3:
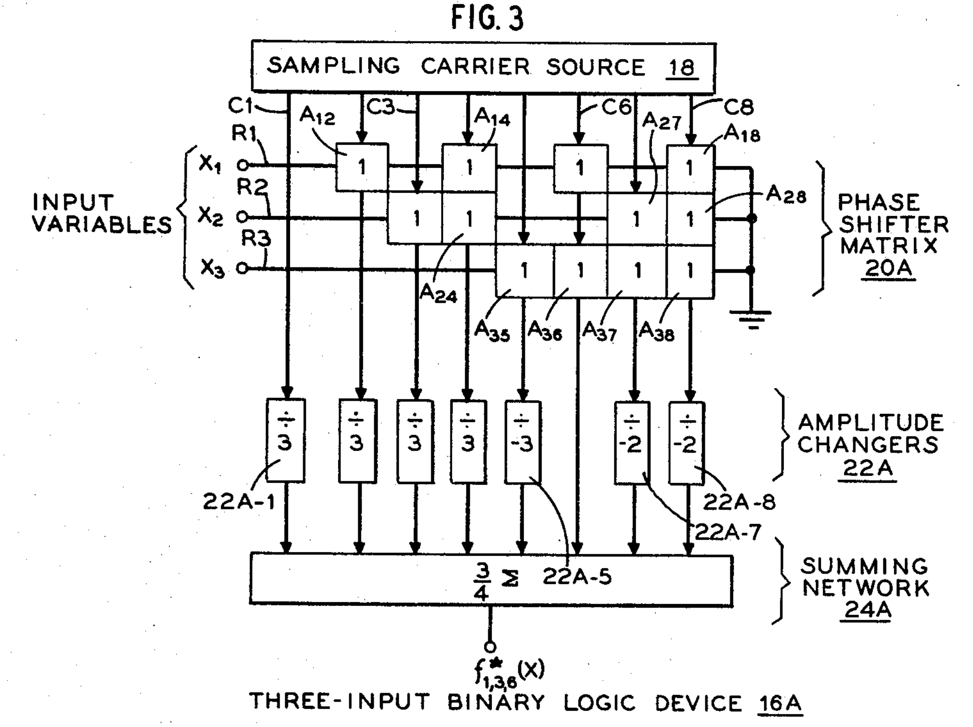
FIGURE 3 shows schematically a simplification of the logic device of FIGURE 2.

Several comments with respect to the three-input binary logic devices 16 and 16A of FIGURES 2 and 3 are now in order. Mathematically, the input variables are involved in an operation over a field of two elements and then over the real field. In particular, the input variables are subjected to two linear transformations. The first is an "input transformation" involving the field of two elements; the second is an "output transformation" involving the real field. The input transformation is performed by the phase shifter matrix 20 and the output transformation by the amplitude changers 22 and summing network 24.

Physically and for the present on a functional level the various elements of the logic devices 16 and 16A will be described. Since many elements are the same in both devices, the common elements will be described and when they differ the specific differences will be pointed out.

Sampling carrier source 18 is a source of an alternating current carrier signal which feeds the eight column lines C1 to C8 in parallel and in the same phase. The column lines are operatively coupled to all phase shifters $a_{ij}$ in their associated columns. For example, the carrier signal on column line C8 is influenced by phase shifters $a_{18}$, $a_{28}$, $a_{38}$. Each of the input variables $x_1$, $x_2$, $x_3$ is a DC signal which is either present or absent on the respective row lines R1, R2, R3. Each of the row lines is operatively coupled to all phase shifters $a_{ij}$ in its associated row. For example, the DC signal on row line R3 influences phase shifters $A_{31}$ to $A_{38}$. A typical phase shifter $a_{ij}$ is a controllable device which introduces a 180° differential phase shift in a signal on a line operatively coupled thereto only when a control signal is present on a control line operatively coupled to the phase shifter. For example, phase shifter $A_{12}$ will introduce a 180° phase shift in the carrier signal on column line C2 only when a signal (representing binary logic "1" for $x_1$) is present on row line R1. When no signal is present (representing binary logic "0") phase shifter $A_{12}$ introduces no differential phase shift in the carrier signal on column line C2. The amplitude changers 22–1 to 22–8 can be operational amplifiers having the appropriate gain as indicated by the multiplication factor. For example, change 22–1 can be a linear amplifier with a gain of two. Where a negative multiplier is shown, such as changer 22–8, the amplifier can include a phase inverter. The advantage of rescaling or normalizing the weight factors is seen by the simplification introduced in FIGURE 3. Each of the amplitude changers is now an attenuator and can be a passive resistance network. The summing networks 24 and 24A functionally perform a linear voltage sum of the eight signals they receive from the amplitude changers. In addition they scale the sum, through the agency of attenuators in accordance with the desired scaling factor, i.e. network 24 divides the amplitude by eight and network 24A by three-quarters.

For either device 16 or 16A when the input variables $x_1$, $x_2$ and $x_3$ satisfy the conditions given in Table 1, i.e. the output of the summing network 24 or 24A has a phase value "−1" which by definition is binary logic value "1." For any other values of the input variables the output has the phase value "+1" which by definition is binary logic value "0."

Up to this point the devices have been purely linear. However, if the output of the devices 16 and 16A are fed to a non-linear single threshold element further simplification is possible. Thresholding is determined purely by the phase of the output and for the case under consideration is merely determined by the sign of the output signal. Therefore Equation 18 can be written as $$f^*_{1,3,6}(x)=\text{sgn}\ (\{xA^T\}^*w_0) \qquad (20)$$

where sgn indicates the sign (+) or (−) for a binary system. Now it can be shown that such an equation permits the changing of the $w_0$ weight vector (a one-column matrix) to a different value $w$ as long as $$dg(f^*(x))Hw>0 \qquad (21)$$

where $dg(f^*(x))$ is the diagonal matrix representation of $f^*(x)$.

For most network implementations, it would be desirable to reduce the number of columns in the matrix $A^T$ and thereby the number of inputs to the single threshold element. This corresponds to finding the minimum number of non-zero entries in the weight vector $w$. Other criteria, such as minimizing the number of "1's" in the matrix $A^T$ and minimizing the sum of the values of the weight entries can be used. The final choice of optimality criteria is largely a matter of design philosophy and depends on the actual physical components available for implementing the realization.

There will now be given an example of the minimizing process wherein the minimizing conditions were given the following priority: (1) reduction of the number of columns in the matrix $A^T$; (2) reduction of the number of "1's" in the matrix $A^T$; and (3) reduction of the magnitudes of the entries in the weight matrix.

The function $f^*_{1,3,6}(x)$ will again be used. Through trial-and-error and using the minimizing criteria given above the weight matrix is:

$$\begin{bmatrix}+1\\+1\\+1\\0\\0\\+2\\0\\0\end{bmatrix}$$

Therefore, using Equation 20 with the new weight matrix, (22)

$$f^*_{1,3,6}(x)=\text{sgn}\left(\left\{(x_3,x_2,x_1)\begin{bmatrix}0&0&0&0&1&1&1&1\\0&0&1&1&0&0&1&1\\0&1&0&1&0&1&0&1\end{bmatrix}\right\}^*\begin{bmatrix}+1\\+1\\+1\\0\\0\\+2\\0\\0\end{bmatrix}\right)$$

Since the third, fourth, seventh and eighth entries in the column w are zero, the third, fourth, seventh and eighth columns of the matrix $A^T$ can be deleted.

It should also be noted that each one of the entries in the column matrix $w$ can also be multiplied by ½ without changing the sign of the function. This permits the use of attenuators. Therefore, (23)

$$f^*_{1,3,6}(x)=\text{sgn}\left(\left\{(x_3,\ x_2,\ x_1)\begin{bmatrix}0&0&0&1\\0&0&1&0\\0&1&0&1\end{bmatrix}\right\}^*\begin{bmatrix}+\frac{1}{2}\\+\frac{1}{2}\\+\frac{1}{2}\\+1\end{bmatrix}\right)$$

FIGURE 4 shows a schematic realization of the so-minimized logic device 16B. It can be seen that most of the components are the same as previously described and consequently carry the same reference characters only modified by a different alphabetic suffix. The only added component is the phase detector 25 which compares the phases of the signal from the output of the summing network 24B with the standard phase of the carrier signal generated by source 18. When the phases are equal detector 25 yields a dc output signal indicating binary value "1" and when the phases are different no signal is obtained indicating binary value "0."

Logic device 16B can be considered as an input phase transformation network (matrix 20B) and a single threshold element comprising amplitude changers 22B, summing network 24B and phase detector 25.

In another sense device 16B can be considered as a plurality of exclusive-or logic elements whose outputs feed the inputs of a single threshold element. A typical exclusive-or element is the combination of phase shifters $A_{16}$ and $A_{36}$ having inputs variables $x_1$ and $x_3$ and an output line feeding atenuator 22B–6. Of course phase shifter $A_{23}$ having input variable $x_2$ and phase shifter $A_{12}$ having input variable $x_1$ are degenerate exclusive-or elements.

Similarly, devices 16 and 16A can be considered as a plurality of exclusive-or elements feeding in parallel a weighted summing element. For example, in device 16A phase shifters $A_{27}$ and $A_{37}$ having input variables $x_2$ and $x_3$ is a typical exclusive-or element which feeds the input of attenuator 22A–7 (the weighted summing element).

Let us now return to Equation 19 which is directed to a two-input ternary logic operation. The functional realization of this operation is the two-input ternary logic device 36 shown in FIGURE 5. The sampling carrier source 18 is the same as previously described and transmits, in parallel, over the column lines C1 to C9 the same phased alternating-current carrier signals. The column lines C1 to C9 are operatively coupled to all the phase shifters aij of their asociated columns in the phase shifter matrix 40. For example, the carrier signal on column line C9 is influenced by phase shifters $A_{19}$ and $A_{29}$. Each of the input variable $x_1$ and $x_2$ is a DC (as opposed to carrier) signal which is either absent, or is present and has a given amplitude or is present and has twice the given amplitude on the respective row lines R1 and R2. Each of the row lines is operatively coupled to all phase shifters in the row. For example a signal on row line R1 influences the phase shifters $A_{1j}$ ($j$= 1 to 9).

The phase shifters Aij of the matrix 40 will now be discussed. Each phase shifter of the "0" type, ie. phase shifters $A_{11}$, $A_{14}$, $A_{17}$, $A_{21}$, $A_{22}$, and $A_{23}$ introduce no phase shifts regardless of the signals on row lines R1 and R2. Therefore, they can be deleted. The phase shifters of the "1" type are the phase shifters $A_{12}$, $A_{15}$, $A_{18}$, $A_{24}$, $A_{25}$, and $A_{26}$. A typical "1" type phase shifter $A_{12}$ will be discussed. When no signal is present on row line R1 ($x_1$=0), phase shifter $A_{12}$ introduces no phase shift in the signal on line C2. When a signal of the given amplitude is on line R1 ($x_1$=1) a 120° phase shift is introduced in the carrier signal on line C2 by the phase shifter, and when a signal of twice the given amplitude is on line R1 ($x_1$=2) a 240° phase shift is introduced in the carrier signal on line C2 by that phase shifter. The phase shifters of the "2" type are the phase shitfers $A_{13}$, $A_{16}$, $A_{19}$, $A_{27}$, $A_{28}$, and $A_{29}$. A typical "2" type phase shifters $A_{27}$ will be discussed. When no signal is present on line R2 ($x_2$=0), the phase shifter $A_{27}$ introduces no phase shift in the carrier signal on line C7. When a signal of the given amplitude is on line R2 ($x_2$=1) a 240° phase shift is introduced in the carrier signal on line C7 by the phase shifter; and when a signal of twice the given amplitude is present on line C2 ($x_2$=2) a 480° (effectively a 120°) phase shift is introduced in the carrier signal on line C7 by that phase shifter.

The amplitude and phase changers 42–1 to 42–9 each have an input connected to one of the column lines C1 and C9 and an output connected to the input of summing network 24C. Each of the changers 42 not only changes the amplitude of the signal but also changes the phase of the signal. The typical changer 42–1 multiplies the signal on the line C1 by the complex factor $$-1+E=1+1/120°\approx1.7/160°$$

Thus changer 42–1 can be an amplifier with a gain of 1.7 and a phase shift network which introduces a 160° phase shift.

The summing network 24C is again a conventional linear summing network and an attenuator which divides the sum by a factor of nine.

Just as in the case of the three-input binary logic device 16 it is possible to simplify the two-input ternary logic device 36. For example, and preferably, the changers 42 can be normalized so that only attenuators and phase shift networks are used instead of amplifiers and phase shift networks. In addition, since changer 42–2 calls for a multiplication by zero, line C2 and phase shifter $A_{12}$ can be deleted. However, greatest simplification occurs when the device is changed from a linear network to a non-linear network by using a single threshold element. In such a case Equation 19 can be rewritten as,

(24) $$f^*_{16}(x)=\phi(xA^T)^*w)$$

where $\phi$ indicates $n2\pi/3$ and $n$=0, 1 or 2 for a ternary system. By satisfying the conditions of Equation 21 while following the minimizing conditions used in finding the weight vector for device 16A of FIGURE 4 the modified weight vector or matrix $$\begin{bmatrix}0\\0\\2E+E^2\\1+2E^2\\0\\3E\\0\\0\\0\end{bmatrix}$$

is obtained.

Therefore, using the modified weight matrix so obtained Equation 24 can be rewritten (25)

$$f_{16}^*(x)=\phi\left(\left\{(x_2,x_1)\begin{bmatrix}0&1&2&0&1&2&0&1&2\\0&0&0&1&1&1&2&2&2\end{bmatrix}\right\}^*\begin{bmatrix}0\\0\\2E+E^2\\1+2E^2\\0\\3E\\0\\0\\0\end{bmatrix}\right)$$

By virtue of the "0" components in the weight matrix, Equation 25 simplifies to (26)

$$f_{16}^*(x)=\phi\left(\left\{(x_2,x_1)\begin{bmatrix}2&0&2\\0&1&1\end{bmatrix}\right\}^*\begin{bmatrix}2E+E^2\\1+2E^2\\3E\end{bmatrix}\right)$$

The realization of this equation is obtained by two-input ternary logic device 36A of FIGURE 6. Since most of the elements of device 36A are similar to the elements of device 36 only the differences will be described. Only three column lines C3, C4 and C6 are required. Only phase shifters $A_{13}$, $A_{16}$, $A_{24}$ and $A_{26}$ are retained. (Phase shifter matrix 40A has degenerated to four phase shifters.) The values of the changers has changed not only to account for the new weight vector but also to take into account the use of only attenuators and phase shift networks. Changer 42A–3 is an attenuator and a phase shifter with an attenuation factor is 0.58 and a phase shift value of 150°. Changer 42A–4 is also an attenuator and a phase shifter with an attenuation factor of 0.58 and a phase shift value of 270°. Changer 42A-6 is a phase shifter with a phase shift value of 120°. In addition, a three level phase discriminator 44 has been interposed between the output of the summing network 24D and the final output.

For any of the above described devices it is also possible to choose the weight vector such that outputs of the devices are in the same representation as the input variables.

For example, in a binary logic system the input variables are logic "0" and logic "1" (represented, for example, by voltage amplitude values 0 and 1) and heretofore for the devices 16 and 16A (FIGURES 2 and 3) the actual output is either "1" or "−1" (represented by a carrier signal phase of 0° or 180°). It would be desirable in many cases to obtain an output which has voltage amplitudes of 0 and 1. Such an output can be accomplished by using phase detectors. However, by choosing the appropriate weight vector the desired type of output is directly obtainable.

In particular, if $$(27)\ W_0 = H^C f$$

instead of $H^C f^*$ as in Equation 9 the so obtained weight vector produces the desired result. Considering again the three-input binary logic function $f(1,3,6)$ as the example $$(28)\ W_0 = [H^C{}_{(3,2)}] f_{1,3,6}(x)$$

where $f(x)$ is defined in Equation 14 and $[H^C{}_{(3,2)}]$ is defined in Equation 11. Substitution of the values of $[H^C{}_{(3,2)}]$ and $f(x)$ in Equation 28 gives the result $$(29)\quad w_0 = \begin{bmatrix} 3 \\ -1 \\ -1 \\ -1 \\ +1 \\ -3 \\ +1 \\ +1 \end{bmatrix}$$

Therefore, if the amplitude changers 22 of FIGURE 2 are changed as follows: changer 22–1 is an amplifier with a gain of three; changers 22–2, 22–3 and 24–4 are inverting amplifiers with unity gain; changers 22–5, 22–7 and 22–8 are unity gain amplifiers; and changer 22–6 is an inverting amplifier with a gain of three, the output of the summing network 24 is a 0 amplitude voltage or a 1 amplitude voltage. Of course, it is possible to normalize the components of the weight vector so that there is no need for amplifiers and only attenuators and 180° fixed phase shifters can be employed.

In such a case the weight vector would become $$W_O = (1, -1/3, -1/3, -1/3, +1/3, -1, +1/3, +1/3)$$

However, the 1/8 attenuation factor in the summing network 24 would be changed to a 3/8 attenuation factor.

Again it is possible to utilize the above described minimizing techniques with a threshold element and obtain a much simpler realization of the device. Since, the calculations are straight forward only the result will be given as the three-input binary logic device 16C as shown in FIGURE 7.

It will be seen that the device is similar to device 16B (FIGURE 4) except for the attenuation values of the amplitude changers 22C; the attenuation value in the summing network 24C and an amplitude threshold detector 27 has been substituted for the phase detector 25. In particular, changers 22C–2 and 22C–3 halve the amplitudes of the signals on column lines C2 and C3 respectively requiring 2:1 attenuators; and changers 22C–2, 22C–3 and 22C–6 introduce a 180° phase shift in the signals passing therethrough. The nature of the calculations requires that the detector 27 threshold at a voltage amplitude of 3 while the attenuation factor for the summing network be 1/4. However, if the attenuation factor be made 1/12 then the detector 27 can threshold at a voltage amplitude value of 1. In any event, the detector 27 can be a diode biased at the desired threshold voltage amplitude value.

Just as for the binary logic system it is also possible to obtain an amplitude level output for the logic device instead of a phase level output as with the logic 36 of FIGURE 5.

Again, utilizing Equation 27 for the ternary logic system $$(30)\quad W_O = [H^C{}_{(2,3)}] f(x)$$

where $H^C{}_{(2,3)}$ is defined by Equation 12 and $f(x) = (1,0,2,2,1,0,1,2,1)$ as defined by the logic value column of Table 2.

The calculation yields, $$(31)\quad W_O = (10,1,1,E,E,2+5E^2,E^2,2+5E,E^2)$$

When the components of the so obtained weight vector are used in the amplitude and phase changers 42 of the device 36 (FIGURE 5), the output of the summing network 24C will merely be a signal having voltage amplitude levels of 0, 1 or 2 instead of a carrier signal having a phase relation with respect to a reference signal of 0°, 120° or 240°. Of course, normalizing of the values of the changers 42 can be employed so that the changes are merely, in the worst case, attenuators and fixed phase shifters.

Here again minimizing can be performed in conjunction with a single threshold element. Since the calculations are straight forward and similar to previously described calculations only the results are shown as two-input ternary logic device 36B of FIGURE 8. The elements of the device 36B are similar to the elements of the device 36A except for the values used in the amplitude and phase changers, and a voltage amplitude discriminator 45 is used instead of a carrier signal phase discriminator 44. Although the changer values are given as complex multipliers it should be realized that they can be normalized so that only attenuators and fixed phase shifters are used. The nature of the calculations requires that the discriminator 45 threshold and give a voltage amplitude value of 2 for voltage amplitude values of its input amplitudes greater than 12, a value of 1 for input amplitudes less than 12 and greater than 4 and a value of 0 for input amplitudes less than 4. Of course, when the changer values are normalized, the attenuation constant in the summing network 24D and the voltage amplitude threshold level in the discriminator 45 are correspondingly adjusted. It is preferable to normalize the changer values and delete the attenuation value of the summing network and then adjust the threshold levels in the discriminator 45 to compensate for the normalization and the deletion. In any case appropriately biased diodes can be used for the discriminator 45.

In each of the devices the key elements are: a phase shifter matrix (by the term matrix is meant to include the subset of degenerate matrices, i.e., those not having a phase shifter at each row and column intersection); an array of amplitude and phase changes (this term is used generically to include devices which either change both signal amplitude and phase, or signal amplitude only; or signal phase only); and asumming network. In those devices where minimization techniques have been employed there is also required a signal threshold element (this term is meant to include both amplitude level threshold devices or carrier signal phase threshold devices).

Specific examples of the various elements of the devices will now be given.

Although the devices will operate to any signal frequency from audio beyond microwave to light, they are ideally suited for the microwave spectrum because of size considerations and the utilization of stripline or micro-stripline components which can be "printed" while specific examples of elements utilizing printed micro-stripline techniques are shown, the invention is not limited to such devices but is equally applicable to electrically equivalent lumped parameter elements.

One of the basic building blocks of many of the devices is a 90 degree hybrid or 3 db coupler, hereinafter called a coupler. A functional or logic diagram of the coupler is shown in FIG. 9. Coupler 50 has four ports 51, 52, 53, 54. The coupler is linear and reciprocal. The coupler also has a given bandpass and has a characteristic impedance at the ports. Unless otherwise indicated the microwave-signal energy has frequencies within the passband of the coupler and the devices connected to the couplers have input and output impedances which match the characteristic impedance of the couplers. For the sake of definiteness the ports 51 and 52 are considered to be the input ports of the coupler and the ports 53 and 54 are considered to be the output ports of the coupler. Because of the reciprocal nature of the coupler the input ports and output ports can be interchanged.

If a microwave signal is received at the first input port 51 the power or energy of the signal is split into two equal quantities. One quantity is fed to the first output port 53 and the other is fed to the second output port 54. The signal phase of the voltage component of the power transmitted from output port 53 is delayed by 90 electrical degrees or one-quarter of an operating wavelength from the signal phase of the power transmitted from output port 54. Thus, if the voltage component of the microwave power received at input port 52 is represented by the quantity A, the ports 53 and 54 transmit microwave energy having a voltage represented by the quantities $$-\frac{1}{\sqrt{2}}A$$

and $$-j\frac{1}{\sqrt{2}}A$$

respectively. Similarly, if a microwave signal is received at the second input port 52, the power of the signal is split into two equal quantities, one half of the power is fed to each of the output ports 53 and 54. The phase of the voltage component of the power transmitted from output port 54 is delayed by 90 electrical degrees or one-quarter of an operating wavelength from the signal phase of the voltage component of the power transmitted from output port 54. Thus, if the microwave power received at input port 52 has a voltage component represented by the quantity B, the ports 53 and 54 transmit microwave power having a voltage component represented by the quantities $$-j\frac{1}{\sqrt{2}}B$$

and $$-\frac{1}{\sqrt{2}}B$$

respectively. If microwave-signal power is simultaneously applied to input ports 51 and 52, signal superposition occurs because the coupler is linear. Therefore, by using the above indicated terminology, when microwave power received at input port 51 has a voltage component represented by A and the microwave power received at input port 52 has a voltage component represented by B, output port 53 transmits microwave power having a voltage component represented by $$-\frac{1}{\sqrt{2}}(A+jB)$$

and output port 54 transmits microwave power having a voltage component represented by $$-\frac{1}{\sqrt{2}}(jA+B)$$

Hence, the names 3 db coupler or 90 degree hybrid. Two points are worth repeating: (1) any power received at an input port is divided equally between the output ports; and (2) the signals transmitted by the output ports have a phase difference.

There are several ways of physically realizing the coupler. The most economically worthwhile way for large microwave-signal-processing systems is by using shielded (double-ground plane) striplines or microstriplines. Many embodiments of stripline and microstripline couplers are available. An example of each will be given.

A microstripline embodiment is shown in FIG. 10 in the form of a branch-line coupler. Coupler 50A comprises a grand-plane element 55, a sheet of dielectric material 56 on the ground-plane element, and first and second linear conductors 57 and 58 on sheet 56. Linear conductor 57 electromagnetically cooperates with ground-plane elements 55 to form a transmission line of the microstripline type; and linear conductor 58 electromagnetically cooperates with ground-phase element 55 to form another transmission line of the microstripline type. Linear conductors 57 and 58 are parallel and spaced from each other by one-quarter of an operating wavelength. Two further linear conductors 59 and 60 are on top surface of sheet 55. These conductors are mutually parallel orthogonal to, and contact linear conductors 57 and 58. Conductors 59 and 60 are mutually spaced by one-quarter of an operating wavelength. Conductor 59 electromagnetically cooperates with ground-plane element 55 to form a transmission line of the microstripline type; and conductor 60 electromagnetically cooperates with ground-plane element 55 to form another transmission line of the microstripline type. The characteristic impedance of the transmission lines associated with linear conductors 57 and 58 is $\sqrt{2}$ times less than the characteristic impedances of the transmission lines associated with conductors 59 and 60. The characteristic impedance is controlled by the thickness of sheet 56 or preferably by the width of the conductors.

An input port 51A is connected to one end of linear conductor 58; the other input port 52A is connected to one end of linear conductor 57. The output ports 53A and 54A are connected to the other ends of linear conductors 57 and 58, respectively. Power transfer between the transmission lines associated with linear conductors 57 and 58 is via the transmission lines associated with linear conductors 59 and 60.

The branch-line coupler 50A has the advantage of ease of fabrication. It is readily made by using present "printed circuit" techniques.

The coupler can also be a coupled-transmission-line coupler as shown in FIG. 11. Coupler 50B comprises a sheet of dielectric material 64 whose bottom surface is covered with a ground-plane element 66. On the top surface are two conductors 68 and 70, each having three contiguous portions. The central portions 68D and 70B are substantially parallel and electromagnetically coupled to each other. The length of these portions is an odd-integral number of quarter-operating wavelengths. The end portions 68A and 70A, and 68C and 70C flare away from each other to minimize any electromagnetic coupling between these portions. On top of conductors 68 and 70 is another sheet of dielectric material 72 whose top surface is covered with a ground-plane element 74. Conductor 68 and ground-plane elements 66 and 74 electromagnetically cooperate to form a transmission line of the shielded-stripline type. Similarly, conductor 70 and ground-plane elements 66 and 74 electromagnetically cooperate to form a transmission line of the shielded-stripline type. Energy flow from one transmission line to the other occurs in the coupling region defined by portions 68B and 70B. Input port 51B is connected to one end of conductor 70 and output port 54B is connected to the other end of conductor 70. Input port 52B is connected to one end of conductor 68 and input port 53B is connected to the other end of conductor 68.

Although in the embodiments of FIGS. 10 and 11 the ports are shown idealized, it should be realized that conventional stripline-to-coaxial line couplings can be employed as well as and preferably other lengths of matching microstripline.

It should be noted that in each case the thickness of the conductors and the ground-plane element has been exaggerated. It should also be realized that the sheet of dielectric material is primarily provided to maintain the required configuration geometry of the conductors and the ground-plane elements.

In building devices which are combinations of the coupler and other elements, the connections between the couplers and the elements will be shown idealized. However, it should be realized that conventional couplings, coaxial lines or microstriplines can be employed. In most cases, it is fruitful to connect the couplers by microstriplines which are printed on the substrates from which the couplers are fabricated to form an integrated package.

FIGURE 12 shows a power splitter 84 combining couplers 50 in a tree array. The power splitter 84 comprises the couplers 50A, 50B and 50C. The input ports 86, 88 and 90 of couplers 50A, 50B and 50C, respectively, are terminated with reflectionless-microwave-energy dissipation means in the form of microwave resistors R1, R2 and R3, respectively, having resistance equal to the characteristic impedance of the input ports. The output port 92 of coupler 50A is connected to the input 94 of coupler 50B, and the output port 96 is coupled to the input port 98 of coupler 50C. When microwave-signal power is received at the input port 99, it is divided and fed in equal quantities and phase to the output ports 100 and 102 of coupler 50B, and output ports 104 and 106 of coupler 50C.

The power splitter 84 divides the received microwave-signal power into four channels. Eight and higher channel power division can be obtained by adding successive levels of couplers to the tree array. Any unused output port should be terminated with a characteristic impedance resistor.

Now when a source of microwave power is coupled to input port 99 power splitter 84 in combination with the source of microwave power can be used as the sampling carrier source 18 where each of the output posts of the power splitter 84 is coupled to one of the column lines C and S1 of FIGS. 3 to 8.

By virtue of the bilateralism or reciprocity of the power splitter 84, it can be used as a signal summer. In particular, the ports 100, 102, 104 and 106 become the input ports and port 99 the output port. In such a case power splitter 84 (with possibly more levels) can be used as the basic component of the summing networks 24. Where the summing networks require attenuation appropriate microwave resistances can be added.

The coupler 50 used in conjunction with a microwave diode can be used as the phase detector 25 of FIG. 4. The details of the phase detector 25 are shown in FIG. 13. Input port 52A is coupled to source 18 via a microstripline having an integral number of operating wavelengths. Input port 51A is coupled to summing network 24B via a microstripline having an integral number of operating wavelengths. In other words, no differential phase shift modulo $2\pi$ should be introduced between the signal received at input port 52A from source 18 and the signal received at input port 51A from network 24B by virtue of the coupling links. Output port 53A is connected to a characteristic impedance terminating resistor R4; and output port 54A (the output of phase detector 25) is connected to diode D1. Now, by virtue of the previously described signal adding properties of coupler 50 there will be a DC output from diode D1 only when the phases of the signals received at ports 51A and 52A are equal.

FIG. 14 shows the physical realization of phase discriminator 44. Again couplers are employed. In this case couplers 50E, 50F and 50G are similar to the previously described couplers and the coupler 60 is a conventional 180° coupler.

The input ports 52E of coupler 50E and the input port 62 of coupler 60 are terminated by characteristic-impedance microwave resistors R5 and R6, respectively. Input port 51E of coupler 50E receives the microwave signal from summing network 24D. Input port 61 of coupler 60 receives, via line S1, the reference signal from sampling carrier source 18. The output ports 53E and 54E of coupler 50E are connected to the input ports 51F of coupler 50F and 51G of coupler 50G, respectively. The output ports 63 and 64 of coupler 60 are connected to the input ports 52G of coupler 50G and 52F of coupler 50F, respectively. The output port 54F of coupler 50F is coupled via diode D2 to one input of differential amplifier 65, and output port 53F is coupled via diode D3 to the other input of differential amplifier 65. The output ports 53G and 54G of coupler 50G are connected via diodes D5 and D4 respectively to inputs of differential amplifier 66. Differential amplifiers 65 and 66 are conventional differential amplifiers which transmit D.C. signals from their outputs 67 and 68 whose polarity is related to the amplitude difference of the signals received at the inputs of the amplifiers.

If the voltage at the output 67 of amplifier 65 is positive, regardless of the value of the voltage at the output 68 of amplifier 66, then there is a phase difference between the unknown signal and the reference signal is between 270° and 90° which implies that the value of the function is "1." If the voltage at the output 67 of amplifier 65 is negative and the voltage at the output 68 of amplifier 66 is positive, then the phase difference between the unknown signal and the reference signal is between 90° and 180° implying that the value of the function is E. The output voltage of amplifier 65 and of amplifier 66 are both positive when the phase difference is between 180° and 270° implying that the value of the function is $E^2$.

The phase shifters for the matrices 20, 20A and 20B of devices 16 and 16A and 16B (FIGS. 2, 3 and 4) will now be discussed. A typical phase shifter 200 is shown in FIG. 15.

Before discussing the actual hardware some theory will be presented.

In a guided-microwave path the velocity of the flow of the microwave energy is a function of at least the permeability of the medium of the path. Therefore, changes in the medium permeability introduce changes in the velocity of energy flow. These changes in velocity can be equated to changes in the electrical length of the path. A change in the electrical path length is equivalent to a differential delay or phase shift in the microwave signal propagated along the path. Hence, by knowing the available change of permeability in the path and then choosing a mechanical length of the path, any desired differential phase shift can be obtained. By differential phase shift is meant a phase shift other than that introduced by the mere length of the path.

Changes in the permeability in the path are obtained by introducing a ferrite material in the path and then controlling the direction of magnetization of the ferrite material with respect to the direction of polarization of the RF (radiofrequency)-magnetic field component of the microwave energy flowing down the path. For example, assume a microwave signal is transmitted along the Z-axis of an orthogonal coordinate system and the RF-magnetic field component thereof is linearly polarized and vibrating in a direction parallel to the Y-axis. Further, assume there is a ferrite medium in the path of propagation of the microwave energy. The ferrite medium is also assumed to be unsaturated but to be magnetized to a high degree of remanence so that the medium has a domain structure composed mainly of long thin domains, each of which is magnetized to saturation and oriented mainly in the direction of the net magnetization.

Since the RF-magnetic-field component interacts with each domain it is possible to calculate the contribution of each domain to the effective permeability of the medium. Now it can be shown that if the ferrite medium is a planar element lying in the YZ-plane, any domain which lies parallel to the Y-axis does not interact with the RF-magnetic-field component since there is no net torque on the magnetic moments in the domain. The effective permeability of such a domain is therefore unity. Also if a domain lies parallel to the Z-axis the effective permeability is some value less than unity. Such a phenomenon occurs in ferrites having a resonance frequency much lower than the frequency of the microwave energy. A further discussion of this effect can be found in "Topics in Guided Wave Propagation Through Gyromagnetic Media," H. Suhl and L. R. Walker, Bell System Technical Journal, vol. 33, September 1954.

From the above discussion it should be apparent that if a domain direction can be switched by ninety degrees from the Z-axis direction to the Y-axis direction, a reciprocal differential permeability of the medium can be obtained. When the contributions of all domains are considered it can be shown that the differential phase-shift resulting from the differential permeability of the medium is proportional, at least, to the change in remanent magnetization between the Z-axis direction and the Y-axis direction in the ferrite medium.

It should be noted that the effect requires that there be a change in the remanent magnetization and the magnitude of the differential phase shift is directly proportional to the magnitude of the change. Furthermore, for the logic devices now under consideration the ferrite medium should not retain any appreciable remanent magnetization. In other words, the ferrite medium should not be self-latching. This condition is satisfied in a planar ferrite element when:

$$H_c \text{ is less than } 4\pi M_s\,(t/l)$$

where:

$H_c$=the coercivity of the ferrite material
$M_s$=the saturation magnetization of the ferrite material
$t$=the thickness of the ferrite element
$l$=the length of the ferrite element.

Referring now to FIG. 15, a microwave phase-shifting device 200 is shown comprising a planar ground-plane element 202, a planar ferrite element 204, a signal conductor 206, and a control conductor 208. Signal conductor 206 is spaced from ground-plane element 202 to establish a guided-microwave-energy path which is known as a microstripline. Microwave energy will propagate down the line in the TEM mode. (It is also possible to have another ground-plane element spaced above signal conductor 206 to provide a shielded stripline.) Ferrite element 204 is preferably disposed between ground-plane element 202 and signal conductor 206. However, it should be noted that it is possible to place element 204 above signal conductor 206. It is only necessary that the ferrite element be electromagnetically coupled to the path. In its alternate position it will be so coupled by virtue of the TEM mode of microwave-energy propagation. While signal conductor 206 is shown as a ribbon-like conductor it should be noted that it is preferable to "print" signal conductor 206 directly on ferrite element 204. Similarly, it may be desirable to print ground-plane element 202 on ferrite element 204. The phase-shifting device 200 is provided: with a pair of input terminals I1, connected to one end of signal conductor 206 and I2, connected to one end of ground-plane element 202 for receiving microwave energy; and with a pair of output terminals O1, connected to the other end of signal conductor 206, and O2, connected to the other end of ground-plane element 202. Thus, microwave energy received at the input terminals I1 and I2 will be transmitted from output terminals O1 and O2 delayed or shifted in phase. The input and output terminals are serially connected into one of the column lines C of the devices 16, 16A and 16B to become a part of the column line. Note that under any circumstances there will be a delay or phase shift by virtue of the mechanical path length between the input and output terminals. In addition, there will be a differential delay or phase shift depending on the direction of remanent magnetization in the plane of ferrite element 204. Only if the remanent magnetization is longitudinal to the direction of microwave-energy flow, i.e., parallel to signal conductor 206, in either direction, is there a differential phase shift. Note that since the same differential phase shift will occur regardless of the sense of the magnetization with respect to microwave-energy flow as long as the direction of magnetization and the direction of energy flow are parallel, the input and output terminals can be exchanged. Therefore, the device is a reciprocal phase shifter.

The simplest way of obtaining the longitudinal alignment of the remanent magnetization is by energizing control conductor 208. Preferably, control conductor 208 is insulatingly positioned against the bottom face of ground-plane element 202. That face may be covered with a layer of insulation 210 and conductor 208 printed thereon. In this arrangement of the control conductor it should be realized that the magnetic shielding introduced by ground-plane element 202 must not adversely interfere with the establishment of magnetic field in the ferrite element 204 by the control conductor 208. Therefore, the ground-plane element is preferably made of aluminum or copper of minimum thickness. Conductor 208 can also be printed on the top of element 204 but insulated from conductor 206.

The control conductor 208 is provided with terminals C1A and C1B for receiving control voltages. The terminals are serially connected in one of the row lines R of the devices 16, 16A and 16B. As long as control conductor 208 is energized there will be a differential phase shift since the ferrite element is longitudinally magnetized. When the conductor is not energized the element demagnetizes.

By choosing the length of conductor 206 influenced by element 204 and the operating frequency of the microwave signals a 180° phase shift can be obtained. In order to obtain a greater differential phase shift in a given area of the ferrite element, the conductor 206 can be "printed" in a meandering path.

The phase shifters of the matrices 40 and 40A are in some ways similar to the phase shifter 200 in that they introduce phase shift by changing the permeability of a microwave path but they have several important differences. In particular, they are control voltage amplitude sensitive, they latch (do not self-clear when the control voltage is removed), and they are non-reciprocal. The control voltage amplitude sensitivity is required by virtue of the ternary logic involved. In particular, the control voltage electrically represents the input variable. A control voltage of a given value causes the phase shifter to introduce a given phase shift (for a "1" type shifter the shift is 120°; for "2" type phase shifters it is 240°). A control voltage of twice the value causes the phase shifter to introduce a phase shift of twice the given phase shift (for "1" type shifter 240°; for "2" type phase shifter 480°.) The self-latching property requires that the phase shifters be reset to a zero state (no phase shifting) before being set to the desired values. The non-reciprocality permits clearing the phase shifter to a zero state.

While the phase shifters now under consideration introduce phase shift by changing the permeability of the microwave path, the physical phenomenon is different from that described for the phase shifter 200. In particular, assume a microwave signal is transmitted along a guided-microwave-energy path with a circularly polarized, RF-magnetic field component wherein the axis and sense of rotation of that field is represented by a vector in a given direction. If a magnetized ferrite element is included in the path there can be an interaction between the domains of the ferrite element and the magnetic field of the microwave signal. In particular, when the magnetization vector, representing predominant alignment of the domains in a region of the ferrite element has the same direction as the vector representing the axis and sense of rotation of the circularly polarized RF-magnetic field in that region, there is an interaction between the so-aligned domains and the magnetic field, and the permeability of that region changes. If the vectors are oppositely directed there is little interaction and the permeability remains relatively unchanged. Furthermore, orthogonality of the vectors results in little interaction. This condition represents the outer limits of the change in permeability. In those cases where the vectors are not colinear the magnetization vector can be resolved into a colinear and a transverse component with only the colinear component being involved in the interaction.

To summarize, in order to obtain a non-reciprocal phase shift there must be a non-reciprocal interaction between the RF-magnetic field of the microwave energy flowing down a guided-microwave-energy path and the ferrite medium in the path to affect the permeability of the path. The non-reciprocal interaction can be obtained by generating a circularly polarized RF-magnetic field in a suitably magnetized ferrite medium. Such a condition can be produced by the circuit shown in FIGS. 16 and 17. In particular, the circuit 211 is shown comprising a planar ground-plane element 212 and a signal conductor 214 having convolution elements 214A, 214B, 214C and 214D. Ground-plane elements 212 and signal conductor 214 are spaced from each other to provide a guided-microwave-energy path which is known as a microstripline. It is also possible to have another ground-plane element spaced above signal conductor 214 to provide a stripline. When microwave energy is applied to the microstripline for the left side, current flows through signal conductor 214 as represented by the arrowheaded line 216 of FIG. 16 and the "dots" 218 and "crosses" 220 in the convolution elements 14A to 14D (FIG. 17). The RF-current through element 214B generates the conventional RF-magnetic field represented by circle 222 and the RF-current through element 214C generates the conventional RF-magnetic field represented by circle 224.

At the points A and A', the RF-magnetic field $H_1$ arising from current through element 214B is spatially orthogonal to the RF-magnetic field $H_2$ arising from current through element 214C. The resultant magnetic field is represented by vector $H_R$. In order to cause vector $H_R$ to rotate or to produce a circularly-polarized, RF-magnetic field at point A the fields $H_1$ and $H_2$ must be 90° out of (time) phase. This condition is readily accomplished if the length of each of the convolution elements 214A to 214D is an odd number of operating quarter wavelengths. When this is so, the resultant magnetic field is circularly polarized and vector $H_R$ can be assumed to rotate in a counter-clockwise manner. Its axis of rotation is perpendicular to the plane of FIG. 17, passing through point A. It can be represented by a vector directed inward to the page of the figure. If current flow were in the opposite direction, the resultant magnetic field would be circularly polarized in a clockwise sense and its rotational vector representation would be directed outward of the page of the figure. Of course, it should be realized that magnetic fields produced by the current flowing in elements 214A and 214B and elements 214C and 214D similarly interact and produce similarly circularly polarized RF-magnetic fields at points B and C, respectively. The fields are not shown, solely for the sake of simplicity.

In other regions, the relative time phase between the currents falls off (or increases) linearly with distance from the midpoints of the elements and the type of polarization varies from circular at the center through elliptical to linear at the ends of the elements. However, the elliptical polarization has, in a sense, a circular component.

If now a ferrite element is placed in the region of rotational polarization and it is suitably magnetized, the interaction required for non-reciprocal phase shifting is obtained. Accordingly, the ferrite element 226 is placed in the guided-microwave-energy path and in particular between signal conductor 214 and ground-plane element 212. When ferrite element 226 is magnetized in the same direction as the rotational vector representation of the circularly polarized-magnetic field there will be an interaction between the domains of the ferrite material; if in the opposite direction there will be no interaction. Four cases arise:

(1) Microwave energy is transmitted along the direction indicated by arrowheaded line 216 and the magnetization of the ferrite element is in the direction indicated by arrow 228. There is a phase shift.

(2) Microwave energy is transmitted along the direction indicated by arrowheaded line 216 and the magnetization of the ferrite element is in the direction indicated by arrow 230. There is no phase shift.

(3) Microwave energy is transmitted along a direction opposite to that indicated by line 216 and the magnetization of the ferrite element is in the direction indicated by arrow 228. There is no phase shift.

(4) Microwave energy is transmitted along a direction opposite to that indicated by line 216 and the magnetization of the ferrite element is in the direction indicated by arrow 230. There is a phase shift.

A practical realization of the device is shown in FIG. 18 as a non-reciprocal phase-shifting device 230 comprising planar ground-plane element 232, a planar self-latching-ferrite element 234 having an aperture 236, a signal conductor 238 and a control conductor (magnetization-switching means) 240.

Signal conductor 238 is spaced from ground-plane element 232 to establish a guided-microwave-energy path which is known as a microstripline. Microwave energy will propagate down the line in the TEM mode. It is also possible to have another ground-plane element spaced above signal conductor 238 to provide a stripline.

Signal conductor 238 has a transmission terminal TS1, which is connected to a column line C (FIGS. 5 and 6), a plurality of serial convolution elements 238A and 238J, and another transmission terminal TS2 which is connected to a column line C. Special conductor 238 is serially connected in and is part of column line C. The convolution elements are in substantially parallel relationship and each is an odd number of operating quarter wavelengths long.

Ferrite element 234 is preferably disposed between ground-plane element 232 and signal conductor 238. However, it should be noted that it is possible to place element 234 above signal conductor 238. It is only necessary that it be in a region of the circular polarized magnetic field. While signal conductor 238 is shown as a ribbon-like conductor, it should be noted that it is preferable to "print" it directly on ferrite element 234. Similarly it may be desirable to print ground-plane element 232 on ferrite element 234.

Transmission terminals TG1 and TG2 are connected to ground-plane element 232; and terminals TC1 and TC2 which are serially connected in a row line R (FIGS.

5 and 6) are connected to control conductor 240 which becomes part of the row line. Microwave signals may be applied to terminals TS1 and TG1 via a column line C and transmitted from terminals TS2 and TG2 to the column line C. The state of magnetization (remanent) of ferrite element 234 is determined by the direction of current applied to control conductor 240 via terminals TC1 and TC2.

When a voltage pulse is applied across terminals TC1 and TC2, a remanent magnetization is established in ferrite element 234. Its pattern will be substantially circular closed curves, concentric with aperture 236, in planes parallel to ground-plane element 232. The magnetization can be resolved into components longitudinal and transverse to the convolution elements. The longitudinal components will be directed from left to right if the magnetization is clockwise resulting from current flow from terminals TC1 and TC2; and they will be directed from right to left if the magnetization is counter-clockwise resulting from current flow from terminal TC2 to terminal TC1. There will or will not be a phase shift depending on the direction of microwave-energy flow as previously described.

Now it should be noted that the maximum radius of the closed curves is a function of the product of the time and the amplitude of the voltage pulse (assuming a rectangular pulse), on line 240. Therefore, if the voltage pulse has a given amplitude, the magnetization will influence the portion of the path associated with say, convolution elements 238A, 238B, 238F and 238G. If the voltage pulse has twice the given amplitude, the magnetization will influence the portion of the path associated with say, elements 238A, 238B, 238C, 238D, 238F, 238G, 238H, and 238I. Thus, in one case a given phase shift is obtainable and in the other case twice the given phase shift is obtainable. Of course, the convolution elements should be arranged by taking into account the desired phase shifts in view of operating frequency and the times and amplitudes of the voltage pulses and the amount of phase shift desired. Since the phase shift is a function of the product of the amplitude and time of the applied voltage pulse, the input variables X1 and X2 connected to lines R1 and R2 (FIGS. 5 and 6) should be equitimed voltage pulses having amplitudes that are one of two levels when present. By virtue of the latching property of the phase shifter it will be necessary to reset it to a clear state before entering the values of the variables X1 and X2. This is easily accomplished by pulsing the lines R1 and R2 with a voltage pulse having a time duration equal to the time duration of the input voltage pulses representing the variables but having an amplitude at least as great as the greatest amplitude input voltage pulse and having a polarity opposite thereto.

An amplitude and phase changer 42–N is shown in FIG. 19. It can also be fabricated utilizing microstripline techniques. In particular, changer 42–N includes the ground plane element 300 of conductive material. Sandwiched between element 300 and conductor 302 is a spacer element 304 of dielectric material. The changer is provided with the input terminals 306 and 308, and output terminals 310 and 312. Any required phase shift is obtained by selecting the related mechanical path length between the input and output terminals. Any attenuation is obtained by selecting the material used for the signal conductor 302, recognizing the fact that the greater the resistivity of the material the greater the signal attenuation. If no phase shift is required as in the case of most of the amplitude changers 22A and 22B, the path length between the input and output terminals of all such attenuators is the same and only the resistivity of the material is changed.

It should now be apparent that the entire devices can be fabricated from printed microstripline techniques as a monolithic structure built on a substrate. Thus, simple "printing" processes can be used and ease of fabrication, economy, and reliability are readily obtained.

While the invention has been described with respect to binary and ternary logic devices of three and two variables, respectively, it is equally applicable to any level logic system with any number of input variables.

In addition the invention can be realized in the light spectrum by utilizing voltage sensitive optical phase shifters, lenses and the like for the various elements.

While only a limited number of examples of the invention have been given, there will now be obvious to those skilled in the art many modifications and variations which satisfy many or all of the objects of the invention but which do not depart from the spirit thereof.

The embodiments of the invention in which an exclusive property or privilege is claimed are defined as follows:

1. Apparatus for performing a logic operation on a plurality of logic variables in an *l*-level logic system wherein the values of the logic variables are represented by signals having a parameter related to the *l*-levels of the logic system, said apparatus comprising an input transformation means for operating on the signals representing the logic variables to produce a plurality of carrier signals having phase relationships related to the values of the logic variables and the possible combinations of the logic variables in the *l*-level logic system, and an output transformation means including means for modifying at least the amplitude of least one of the plurality of carrier signals at least in a manner at least related to the type of logic operation to be performed, and means for summing the carrier signals including the modified carrier signals to provide a signal representing the result of the logical operation.

2. The apparatus of claim 1 wherein said *l*-level logic system is a two-level logic system.

3. The apparatus of claim 1 wherein said *l*-level logic system is a three-level logic system.

4. The apparatus of claim 1 wherein said output transformation means further includes a signal threshold means connected to said summing means for generating a signal whose amplitude is equivalent to one of the logic levels in accordance with a range of phases of the sum signal generated by said summing means.

5. The apparatus of claim 1 wherein said output transformation means further includes a signal threshold means connected to said summing means for generating a signal whose amplitude is equivalent to one of the logic levels in accordance with a range of amplitude of the sum signal generated by said summing means.

6. Apparatus for performing a logic operation on a plurality of logic variables in an *l*-level logic system wherein the values of the logic variables are represented by signals having amplitudes related to the *l*-levels of the logic system comprising a plurality of exclusive-or logic elements, each of said exclusive-or logic elements being controlled by at least some of the signals representing the logic variables to generate a carrier signal having a phase relative to a given phase in accordance with the values of the logic variables represented by the signals controlling the exclusive-or logic elements, means for modifying at least the amplitudes of some of the carrier signals at least in accordance with the logic operation to be performed, and means for summing the modified carrier signals to generate a signal representing the result of the logic operation.

7. The apparatus of claim 6 further comprising a signal threshold means connected to said summing means for generating a signal whose amplitude is equivalent to one of the logic levels in accordance with a range of a parameter of the sum signal generated by said summing means.

8. The apparatus of claim 6 wherein said exclusive-or logic element comprises a source of carrier signals, a plurality of signal-value-responsive phase shifters, means for connecting said source and said phase shifters in series, and means for coupling a different one of the signals representing the logic variables to each of said phase shifters whereby the signal phase of the carrier signal transmitted from the last phase shifter is dependent on the values of the signals representing the logic variables coupled to said phase shifters.

9. The apparatus of claim 8 wherein the logic system has two levels and the signals representing the logic variables have either one of two values, each of said phase shifters comprising a phase shift element which introduces substantially no phase shift in the carrier signal when the signal representing the logic variable coupled thereto has one of the values and introduces a phase shift of substantially 180° in the carrier signal when the signal representing the logic variable has the other of the values.

10. The apparatus of claim 8 wherein the logic system has three levels and the signals representing the logic variables have either first, second or third values, at least one of said phase shifters comprising a phase shift element which introduces substantially no phase shift in the carrier signal when the signal representing the logic variable coupled thereto has the first value, introduces a phase shift of substantially 120° in the carrier signal when said signal representing the logic variable has the second value, and introduces a phase shift of substantially 240° in the carrier signal when said signal representing the logic variable has the third value.

11. The apparatus of claim 8 wherein the logic system has three levels and the signals representing the logic variables have either first, second or third values, at least one of said phase shifters comprising a phase shift element which introduces substantially no phase shift in the carrier signal when the signal representing the logic variable coupled thereto has the first value, introduces a phase shift of substantially 240° in the carrier signal when said signal representing the logic variable has the second value, and introduces a phase shift of substantially 480° in the carrier signal when said signal representing the logic variable has the third value.

12. Apparatus for performing a logic operation in an $l$-level logic system on $n$ logic variables wherein said logic variables are represented by signals having one of $l$ different values, said apparatus comprising a matrix of phase shifters, each of said phase shifters introducing a given signal phase shift in a carrier signal passing through the phase shifter in accordance with the value of a logic-variable-representing signal coupled to the phase shifter, said matrix having $n$ rows and no more than $l^n$ columns, $n$ row signal conductors, each of said row signal conductors being adapted to receive the signal representing one of the $n$ logic variables, each of said row signal conductors being coupled to the phase shifters in the associated row of the matrix a source of carrier signals, a plurality of carrier signal conductors, each of said carrier signal conductors being associated with one of the columns of the matrix, said carrier signal conductors passing through each of the phase shifters in the associated column, each of said carrier signal conductors having a first end connected to said source of carrier signal and a second end, and signal operator means connected to the second ends of said carrier signal conductors for modifying and combining the carrier signals to generate a signal representing the results of the logic operation.

13. The apparatus of claim 12 wherein said signal operator means includes a plurality of signal phase and amplitude changers for changing at least the signal amplitude of at least some of carrier signals received by the operator means.

14. The apparatus of claim 12 wherein said signal operator means includes a plurality of signal phase and amplitude changers for changing at least signal phase of at least some of carrier signals received by the operator means.

15. The apparatus of claim 12 wherein said signal operator means includes a plurality of signal phase and amplitude changers for changing the signal amplitude and signal phase of at least some of carrier signals received by the operator means.

16. The apparatus of claim 12 wherein said signal operator means includes means for summing the carrier signals received by the operator means.

17. The apparatus of claim 12 wherein said signal operator means comprises a plurality of signal phase and amplitude changers having signal inputs connected to the second ends of said carrier signal conductors and outputs, and carrier signal summing means including a plurality of signal inputs connected to the signal outputs of signal phase and amplitude changers and a signal output for transmitting the signal sum of the carrier signals received from said signal phase and amplitude changers.

18. The apparatus of claim 16 wherein said signal operator means further includes signal threshold sensing means connected to said summing means for transmitting a signal having one of a plurality of values in accordance with different ranges of signal phases of the summed carrier signal.

19. The apparatus of claim 16 wherein said signal operator means further includes signal threshold sensing means connected to said summing means for transmitting a signal having one of a plurality of values in accordance with different ranges of signal amplitudes of the summed carrier signal.

20. The apparatus of claim 17 wherein said signal operator means further includes signal threshold sensing means connected to said carrier signal summing means for transmitting a signal having one of a plurality of values in accordance with different ranges of signal phases of the signal sum of the carrier signals.

21. The apparatus of claim 17 wherein said signal operator means further includes signal threshold sensing means connected to said carrier signal summing means for transmitting a signal having one of a plurality of values in accordance with different ranges of signal amplitudes of the signal sum of the carrier signals.

22. The apparatus of claim 12 wherein the logic system has two levels and the signals representing the logic variables have either one of two values, each of said phase shifters comprising a phase shift element which introduces substantially no phase shift in the carrier signal passing therethrough when the logic-variable-representing signal coupled to the phase shifter has one of said two values and which introduces a phase shift of substantially 180° in the carrier signal passing therethrough when said logic-variable-representing signal has the other of said two values.

23. The apparatus of claim 22 wherein said signal operator means comprises a plurality of signal phase and amplitude changers having signal inputs connected to the second ends of said carrier signal conductors and outputs, and carrier signal summing means including a plurality of signal inputs connected to the signal outputs of signal phase and amplitude changers and a signal output for transmitting the signal sum of the carrier signals received from said signal phase and amplitude changers.

24. The apparatus of claim 23 wherein said signal operator means further includes signal threshold sensing means connected to said carrier signal summing means for transmitting a signal having one of a plurality of values in accordance with different ranges of signal phases of the signal sum of the carrier signals.

25. The apparatus of claim 23 wherein said signal operator means further includes signal threshold sensing means connected to said carrier signal summing means for transmitting a signal having one of a plurality of values in accordance with different ranges of signal amplitudes of the signal sum of the carrier signals.

26. The apparatus of claim 12 wherein the logic system has three levels and the signals representing the logic variables have either first, second or third values, wherein at least one of said phase shifters comprising a phase shift element which introduces substantially no phase shift in the carrier signal passing therethrough when the logic-variable-representing signal coupled to the phase shifter has the first given value, introduces a phase shift of substantially $m$ degrees when said logic-variable-representing signal has the second given value, and introduces a phase shift of substantially $2m$ degrees when said logic-variable-representing signal has the third given value.

27. The apparatus of claim 26 wherein said signal operator means comprises a plurality of signal phase and amplitude changers having signal inputs connected to the second ends of said carrier signal conductors and outputs, and carrier signal summing means including a plurality of signal inputs connected to the signal outputs of signal phase and amplitude changers and a signal output for transmitting the signal sum of the carrier signals received from said signal phase and amplitude changers.

28. The apparatus of claim 27 wherein said signal operator means further includes signal threshold sensing means connected to said carrier signal summing means for transmitting a signal having one of a plurality of values in accordance with different ranges of signal phases of the signal sum of the carrier signals.

29. The apparatus of claim 27 wherein said signal operator means further includes signal threshold sensing means connected to said carrier signal summing means for transmitting a signal having one of a plurality of values in accordance with different ranges of signal amplitudes of the signal sum of the carrier signals.

30. A logic device for performing a logic operation on $n$ logic variables in an $l$-level logic system wherein the logic variables are represented by signals having any one of $l$ different values, comprising a carrier signal source, $n$ signal-value-controlled phase shifters, and carrier signal conductor means for connecting said $n$ phase shifters in series, said carrier signal conductor means having a first end connected to said source of carrier signals and a second end so that carrier signals from said source pass through each of said phase shifters to said second end, means for coupling the signals representing each of said logic variables to one of said $n$ phase shifters, respectively, each of said phase shifters comprises a phase shift element which introduces a carrier signal a phase shift of substantially $$\frac{2\pi kb}{l}$$

degrees, where $k$ equal $0,1,2 \ldots, l-1$, and $b=0,1, \ldots, l-1$, so that each value of the logic variable being represented by the different signal values causes the phase shift element to shift the phase of the carrier signal according to a different value of $k$ whereby the phase of the carrier signal at said second end of said signal conductor represents the result of the logic operation.

31. The logic device of claim 30 wherein the logic system is a two-level logic system and $a$ equal 1 so that $l=2$ and $k$ equals 0 and 1, whereby the phase shift element introduces a phase shift of zero degrees when the signal representing the associated logic variable has a first value and 180 degrees when the signal representing the associated logic variable has a second value.

32. The logic device of claim 30 wherein the logic system is a three-level logic system so that $l=3$ and $k$ equals 0, 1 or 2, for each of the phase shift elements, and $a$ equals 1 for at least one of the phase shift elements whereby said one phase shift element introduces a phase shift of zero degrees when the signal representing the associated logic variable has a first value, a phase shift of substantially 120 degrees when said signal representing the associated logic variable has a second value, and a phase shift of substantially 240 degrees when said signal representing the associated logic variable has a third value.

33. The logic device of claim 30 wherein the logic system is a three-level logic system so that $l=3$ and $k$ equals 0, 1 or 2 for each of the phase shift elements, and $a$ equals 2 for at least one of the phase shift elements whereby said one phase shift element introduces a phase shift of zero degrees when the signal representing the associated logic variable has a first value, a phase shift of substantially 240 degrees when said signal representing the associated logic variable has a second value, and a phase shift of substantially 480 degrees when said signal representing the associated logic variable has a third value.

References Cited

FOREIGN PATENTS 847,535 9/1960 Great Britain.

JOHN S. HEYMAN, Primary Examiner

S. T. KRAWCZEWICZ, Assistant Examiner

U.S. Cl. X.R.

235—176; 307—209; 328—92